(12) United States Patent
He

(10) Patent No.: US 12,159,362 B2
(45) Date of Patent: Dec. 3, 2024

(54) FACIAL MODEL RECONSTRUCTION METHOD AND APPARATUS, AND MEDIUM AND DEVICE

(71) Applicant: Beijing Bytedance Network Technology Co., Ltd., Beijing (CN)

(72) Inventor: Xinting He, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 53 days.

(21) Appl. No.: 17/928,217

(22) PCT Filed: May 21, 2021

(86) PCT No.: PCT/CN2021/095275
§ 371 (c)(1),
(2) Date: Nov. 28, 2022

(87) PCT Pub. No.: WO2021/238809
PCT Pub. Date: Dec. 2, 2021

(65) Prior Publication Data
US 2023/0334801 A1   Oct. 19, 2023

(30) Foreign Application Priority Data
May 29, 2020   (CN) .......................... 202010478888.5

(51) Int. Cl.
*G06T 19/20*   (2011.01)
(52) U.S. Cl.
CPC .......... *G06T 19/20* (2013.01); *G06T 2210/21* (2013.01); *G06T 2219/2004* (2013.01)

(58) Field of Classification Search
None
See application file for complete search history.

(56) References Cited

U.S. PATENT DOCUMENTS 6,781,597 B1 *   8/2004   Vrobel .................... G06T 19/20
                                                              715/848
2009/0231420 A1   9/2009   Kokufu et al.
(Continued)

FOREIGN PATENT DOCUMENTS

| CN | 104217350 A | 12/2014 |
| CN | 104715447 A | 6/2015 |

(Continued)

OTHER PUBLICATIONS

International Search Report and Written Opinion issued in International Patent Application No. PCT/CN2021/095275 on Jun. 24, 2021.

*Primary Examiner* — Sultana M Zalalee
(74) *Attorney, Agent, or Firm* — Astute IP Law Group

(57) ABSTRACT

A facial model reconstruction method and apparatus, and a medium and a device are provided. The facial model reconstruction method comprises: determining an anchor point of a three-dimensional special effect element to be attached on a face; determining an attachment point on a three-dimensional facial model to which the three-dimensional special effect element is to be attached, wherein the three-dimensional facial model corresponds to the face; attaching the anchor point to the attachment point in a way that the anchor point overlaps the attachment point; and moving the anchor point to a center of a world coordinate system of the three-dimensional facial model, and binding the 3D special effect element with the 3D facial model.

18 Claims, 4 Drawing Sheets

(56) References Cited

U.S. PATENT DOCUMENTS

| | | | |
|---|---|---|---|
| 2014/0225922 A1* | 8/2014 | Sbardella | G06T 19/006 |
| | | | 345/633 |
| 2017/0154470 A1 | 6/2017 | Zhang | |
| 2018/0045963 A1* | 2/2018 | Hoover | G06F 3/012 |
| 2019/0362529 A1* | 11/2019 | Wedig | G06T 13/40 |
| 2020/0241629 A1* | 7/2020 | Germer | G06F 3/0304 |
| 2021/0153629 A1* | 5/2021 | Wu | G06V 10/757 |

FOREIGN PATENT DOCUMENTS

| | | | | |
|---|---|---|---|---|
| CN | 110070481 A | | 7/2019 | |
| CN | 110942426 A | | 3/2020 | |
| CN | 110992493 A | * | 4/2020 | A45D 44/005 |
| CN | 111627106 A | | 9/2020 | |

* cited by examiner

FACIAL MODEL RECONSTRUCTION METHOD AND APPARATUS, AND MEDIUM AND DEVICE

This application is the national phase of International Patent Application No. PCT/CN2021/095275 titled "FACIAL MODEL RECONSTRUCTION METHOD AND APPARATUS, AND MEDIUM AND DEVICE", filed on May 21, 2021, which claims priority to Chinese Patent Application No. 202010478888.5, titled "FACIAL MODEL RECONSTRUCTION METHOD AND APPARATUS, AND MEDIUM AND DEVICE", filed on May 29, 2020 with the China National Intellectual Property Administration, both of which are incorporated herein by reference in their entireties.

FIELD

The present disclosure relates to the field of computer technology, and in particular to a method and a device for reconstructing a facial model, a medium, and an apparatus.

BACKGROUND

Conventionally, when adding a special effect element, such as a sticker, to a user video, for example, when adding an eyelash effect to a user video, a usual practice is to provide a standard position, a same displacement for the special effect element, or to assign an alignment of two-dimensional feature points. A disadvantage of such method is that an offset of the special effect element may occur during a head rotation, and the position of the special effect element cannot universally match faces of users.

SUMMARY

The summary is provided to briefly introduce concepts, which are described in detail in the following detailed description. The summary is not intended to identify key features or essential features of the claimed technical solution, nor is it intended to limit the scope of the claimed technical solution.

In a first aspect of the present disclosure, a method for reconstructing a facial model is provided. The method includes: determining an anchor point of a three-dimensional special effect element to be attached on a face; determining an attachment point on a three-dimensional facial model to which the three-dimensional special effect element is to be attached, wherein the three-dimensional facial model corresponds to the face; attaching the anchor point to the attachment point in a way that the anchor point overlaps the attachment point; and moving the anchor point to a center of a world coordinate system of the three-dimensional facial model, and binding the 3D special effect element with the 3D facial model.

In a second aspect of the present disclosure, a device for reconstructing a facial model is provided. The device includes: an anchor point determination module, configured to determine an anchor point of a three-dimensional special effect element to be attached on a face; an attachment point determination module, configured to determine an attachment point on a three-dimensional facial model to which the three-dimensional special effect element is to be attached, wherein the three-dimensional facial model corresponds to the face; a superposition module, configured to attach the anchor point to the attachment point in a way that the anchor point overlaps the attachment point; and a binding module, configured to move the anchor point to overlap a center of a world coordinate system of the three-dimensional facial model, and bind the three-dimensional special effect element with the three-dimensional facial model.

In a third aspect of the present disclosure, a computer-readable medium storing a computer program is provided. The computer program, when being executed by a processing device, performs the method according to the first aspect of the present disclosure.

In a fourth aspect of the present disclosure, an electronic device is provided. The electronic device includes: a storage storing a computer program; and a processing device configured to execute the computer program stored in the storage to implement the method according to the first aspect of the present disclosure.

With the above technical solutions, the anchor point of the three-dimensional (3D) special effect element to be attached to the face is determined, and the attachment point on the 3D facial model to which the 3D special effect element is to be attached is determined; the anchor point of the 3D special effect element is then attached on the attachment point in a way that the anchor point overlaps the attachment point; the anchor point is moved to the center of the world coordinate system of the 3D facial model, and the 3D effect element is bound with the 3D facial model. Thereby, the 3D special effect element is attached to the surface of the 3D facial model, and can move and follow a face action in real time when the face moves. Hence, a real-time interaction between the 3D special effect element and the face action is improved.

Other features and advantages of the present disclosure are illustrated in detail in the following detailed description.

BRIEF DESCRIPTION OF THE DRAWINGS

The above and other features, advantages and aspects of various embodiments of the present disclosure will become clearer when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale. In the drawings.

DETAILED DESCRIPTION

Figure 1:
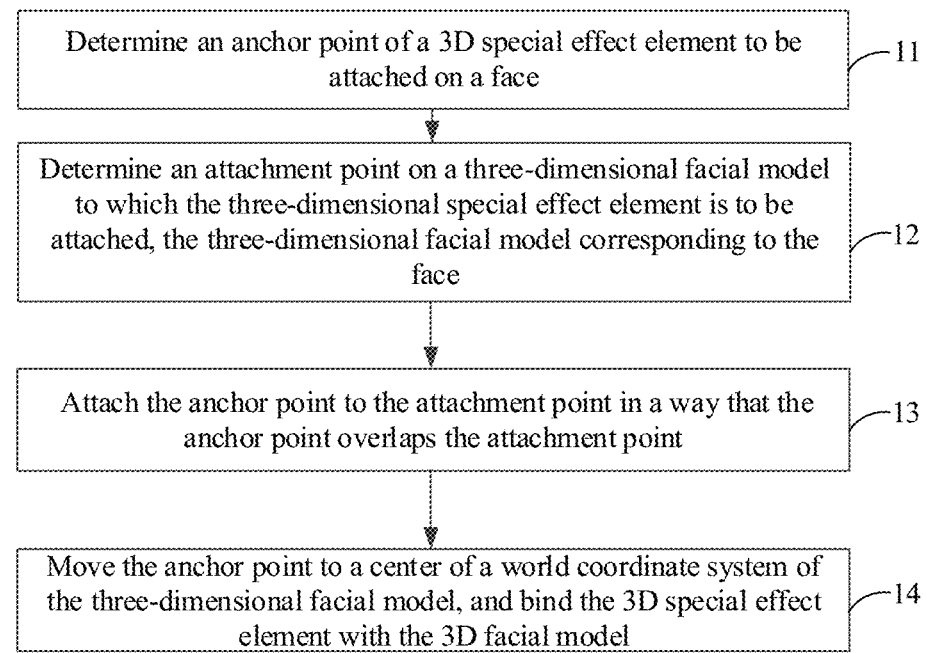
FIG. 1 is a flowchart of a method for reconstructing a facial model according to an embodiment of the present disclosure.

Embodiments of the present disclosure will be described in more detail below with reference to the accompanying drawings. Although certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that wordings such as "first" and "second" used in the present disclosure are used to distinguish different devices, modules or units, and are not used to limit a sequential order or interdependence of functions performed by these devices, modules or units.

It should be noted that the wordings of "a" and "a plurality" used in the present disclosure are illustrative rather than restrictive, and those skilled in the art should understand that these wordings should be understood as "one or more" unless otherwise expressly indicated in the context.

The naming of messages or information exchanged between multiple devices in the embodiments of the present disclosure are only for illustrative purposes, and are not intended to limit the scope of these messages or information.

FIG. 1 is a flowchart of a method for reconstructing a facial model according to an embodiment of the present disclosure. Reference is made to FIG. 1. The method includes steps S11 to S14.

In step S11, an anchor point of a three-dimensional (3D) special effect element to be attached on a human face is determined.

Attachment herein refers to a process of join the 3D special effect element to a 3D facial model. In some examples, the 3D special effect element may be attached to any position on the 3D facial model, so that the 3D special effect element can be adaptively rotated or moved with an orientation that the 3D facial model faces, realizing a synchronous change with the human face. In an implementation, the 3D special effect element may change in real time with a change of a facial expression of a user. For example, in a case that the user is happy, the 3D special effect element (corresponding to a happy expression, for example) is attached to the 3D facial model corresponding to a use face. In a case that the user's expression is calm, the 3D special effect element is removed from the 3D facial model corresponding to the user face to cancel the attachment. An attached object may present a skeletal animation and a physical shaking, and more popular and advanced 3D special effect elements (such as 3D special effect stickers) may be created through development of 3D elements and interaction of physical animation, bringing the user an ultimate experience.

The anchor point defines a central position around which the 3D effect element is shifted, rotated, and scaled. The anchor point may be a position at the bottom of the 3D special effect element, or may be another position (for example, a center) of the 3D special effect element. The position may be set based on an actual usage scene (e.g., an outdoor scene on a sunny day, a party scene, or a home scene) or a type of the 3D special effect element (e.g., eyelashes, hair). A specific position of the anchor point of the 3D special effect element is not limited in the present disclosure, and those skilled in the art may determine an appropriate position as the anchor point of the 3D special effect element based on an actual need.

In step S12, an attachment point on the 3D facial model to which the 3D special effect element is to be attached is determined, where the 3D facial model corresponds to the face.

When constructing (rendering) a 3D facial model, each vertex of the 3D facial model has a vertex identifier, that is, the vertex and the vertex identifier uniquely correspond to each other. Hence, the vertex uniquely corresponding to the vertex identifier may be determined based on the vertex identifier in the 3D facial model corresponding to the face. The attachment point on the 3D facial model to which the 3D special effect element is to be attached may be then determined based on the vertex. For example, the vertex may be determined as the attachment point on the 3D facial model to which the 3D special effect element is to be attached.

In an implementation, the vertex identifier may be represented by a serial number corresponding to the vertex in the 3D facial model when constructing the 3D facial model corresponding to the face. Hence, the vertex may be determined according to the serial number, and then the attachment point on the 3D facial model to which the 3D special effect element is to be attached may be determined, so that a clear position of the attachment point can be determined. In another implementation, a vertex identifier may be represented by a world coordinate of the vertex in the three-dimensional facial model. Hence, the vertex may be determined according to the world coordinate, and then the attachment points of the 3D special effect element in the 3D facial model can be determined.

It should be noted that a scheme for determining a specific position of the attachment point is not limited by the present disclosure. Those skilled in the art may determine the specific position of the attachment point in an actually needed way.

In step S13, the anchor point is attached to the attachment point in a way that the anchor point overlaps the attachment point.

In step S14, the anchor point of the 3D special effect element is moved to a center of a world coordinate system of the 3D facial model, and the 3D special effect element is bound with the 3D facial model.

In this step, the 3D special effect element may be bound with the 3D facial model by disposing the 3D special effect element based on position information of the attachment point and rotation information of the attachment point. The rotation information may be an average surface normal of a region where the attachment point is located. In an example, the rotation information may be an average of multiple surface normals in a region where the attachment point is located, for example, an average of all surface normals in the region where the attachment point is located. The position information may be obtained as described in step S12. By disposing the 3D special effect element at the position of the attachment point and in a direction based on the rotation information, the 3D special effect element can be attached to a surface of the 3D facial model, so as to realizing a binding of the 3D special effect element and the 3D facial model. Binding information may be generated in response to the binding of the 3D special effect element and the 3D. The binding information may be obtained from a script, such as a lua script, configured when producing the 3D special effect element.

Figure 2A:
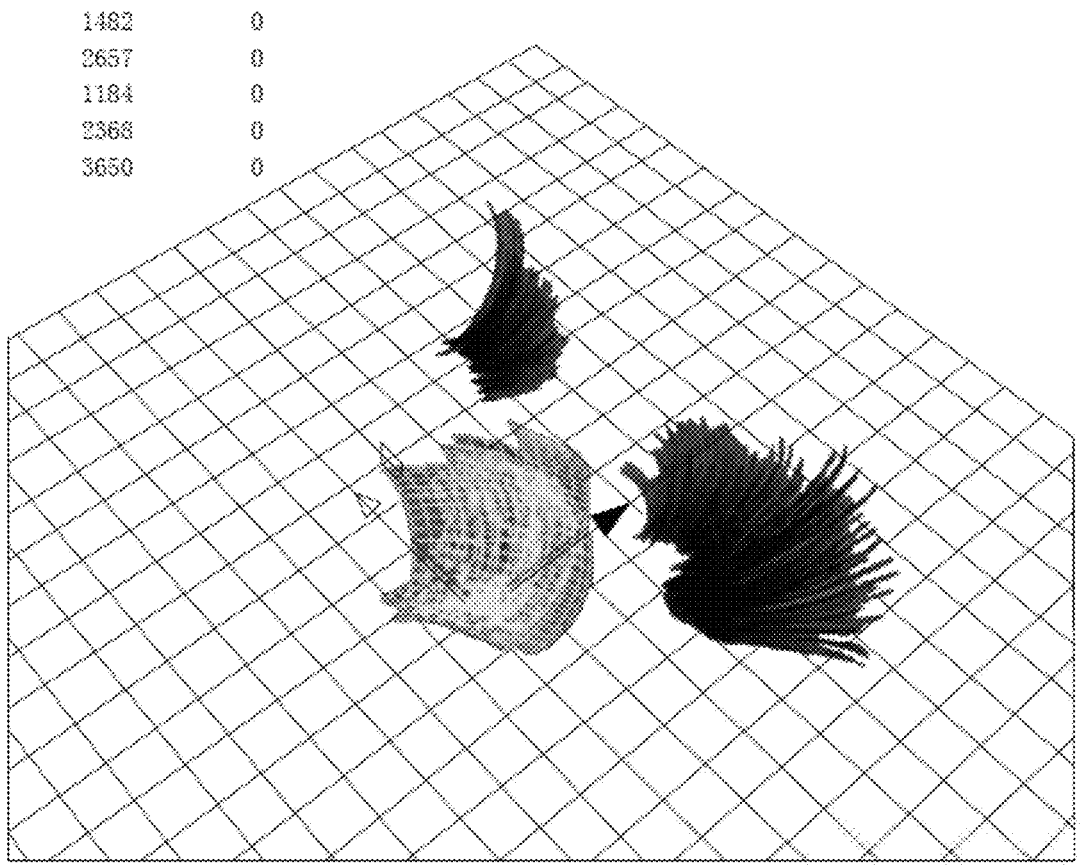
FIG. 2a to FIG. 2c show schematic diagrams of facial model reconstruction by way of an example in which a three-dimensional special effect element is false eyelashes according to an embodiment of the present disclosure.
Figure 2B:
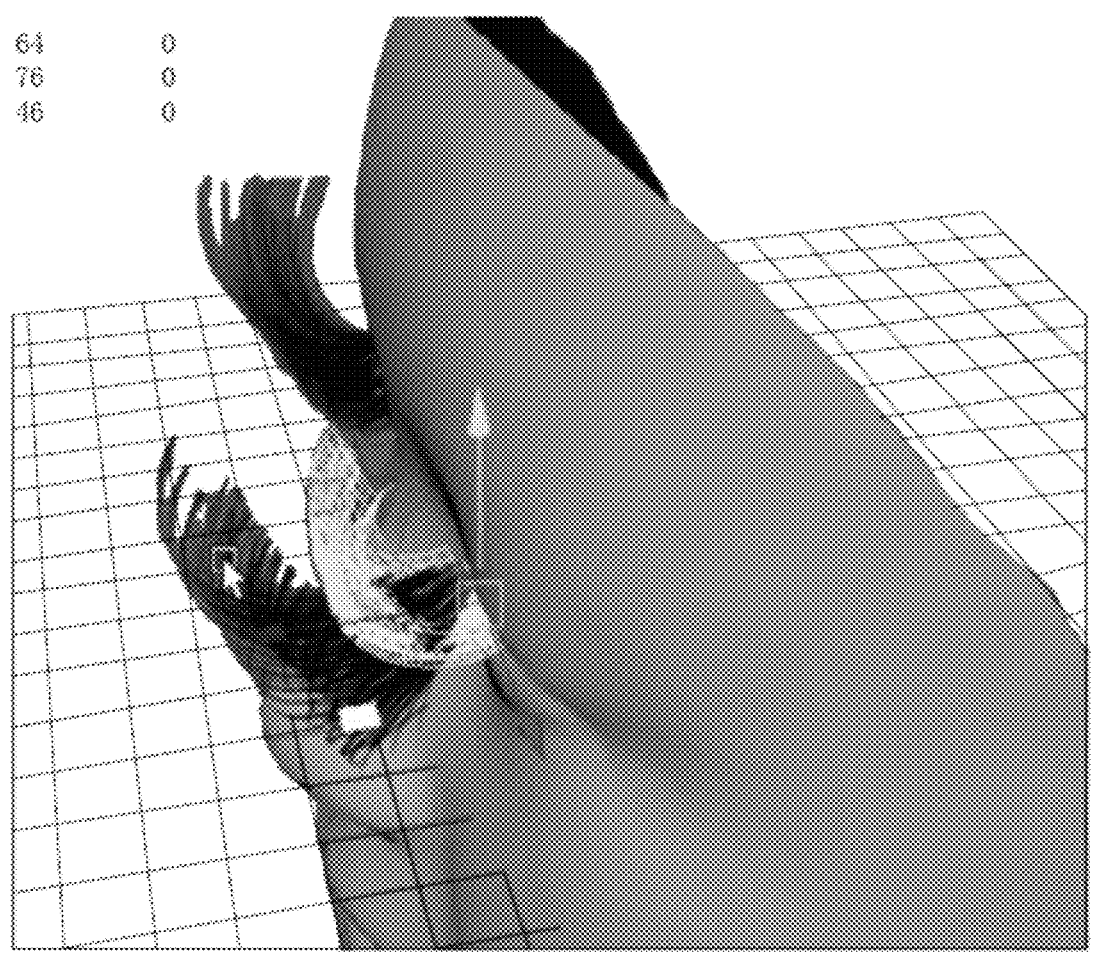
Figure 2C:
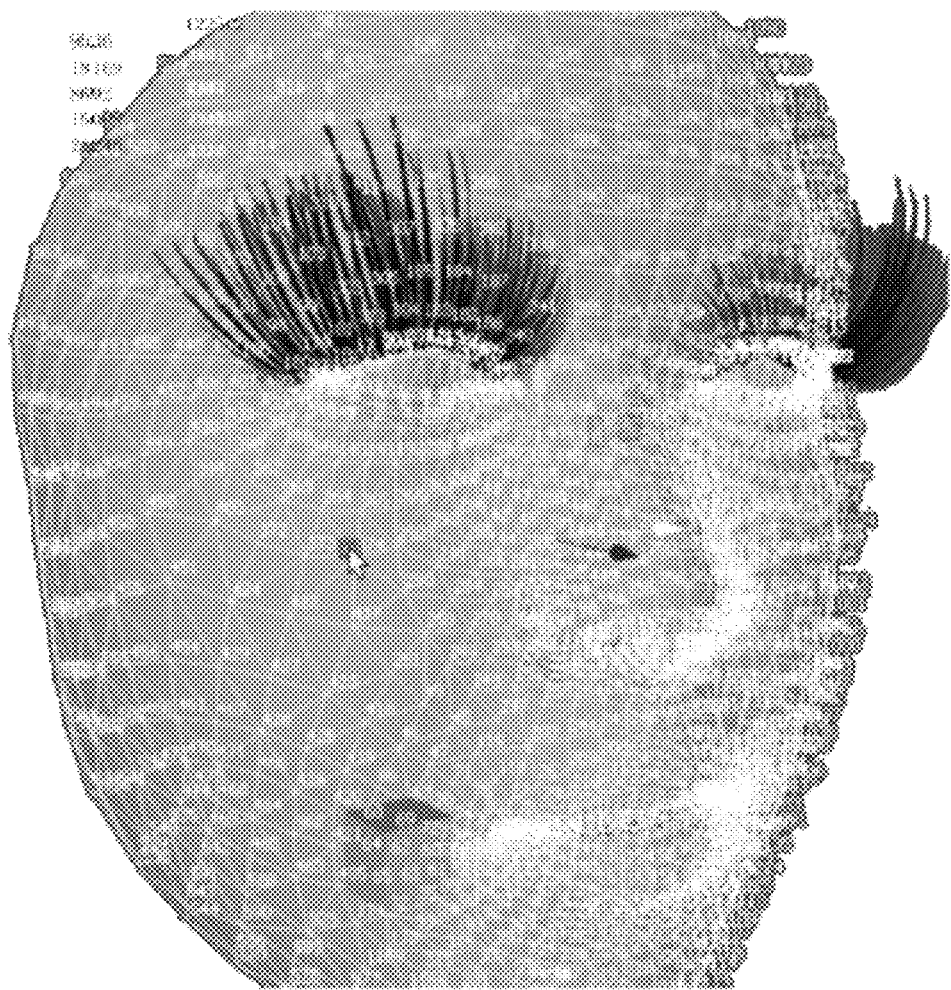

FIG. 2a to FIG. 2c show schematic diagrams of facial model reconstruction by way of an example in which a three-dimensional special effect element is false eyelashes according to an embodiment of the present disclosure. Specifically, FIG. 2a shows determination of an anchor point of a 3D special effect element and an attachment point on the facial model to which the 3D special effect element is to be attached; FIG. 2b shows that the false eyelashes are attached to the attachment point on the facial model; and FIG. 2c shows that the false eyelashes, after attachment, are capable of moving synchronously with the face.

With the above technical solution, the anchor point of the 3D special effect element to be attached to the face is determined, and the attachment point on the 3D facial model to which the 3D special effect element is to be attached is determined; the anchor point of the 3D special effect element is then attached on the attachment point in a way that the anchor point overlaps the attachment point; the anchor point is moved to the center of the world coordinate system of the 3D facial model, and the 3D effect element is bound with the 3D facial model. Thereby, the 3D special effect element is joined to the surface of the 3D facial model, and the 3D special effect element can universally fit any user face, and can move with and follow a face action in real time when the face moves. Hence, an offset of the 3D special effect element during a head rotation is avoided, and a real-time interaction between the 3D special effect element and the face action is improved. For example, when opening and closing eyes, the 3D special effected false eyelashes may move with the eyes synchronously and rotate with an orientation of eyelids. In addition, in this technical solution, feature points namely attachment points of the 3D facial model are obtained, and an interaction between the 3D special effect element and the face can be expanded. For example, an effect that a spider climbs out of the mouth and climbs slowly on the face to the back of the head can be realized, and other procedural animations such as a face growth animation, a fluid animation, and the like can be realized.

In addition, collision detection may be performed during the attachment, that is, a collision force of the 3D special effect element colliding on the face may be detected, and an elastic change of the face may be determined based on the collision force. For example, the elastic change may be the transformation of the face being depressed and then restored to the original. In an embodiment, it is also possible to determine whether there is an elastic change on the face based on the collision force, and further determine a fitting effect of the 3D special effect element on the 3D facial model.

In addition, the 3D special effect element to be attached may be configured with a random dimension and a random direction. Hence, in an example where the 3D special effect element is snowflakes falling over the hair, such configuration can realize that many snowflakes with random dimensions fall over the hair in random directions.

In addition, the method for reconstructing a facial model according to the embodiments of the present disclosure may be used in combination with a particle system, so as to realize more three-dimensional special effects. The particle system is commonly used in games for instantiating a large number of model scenes such as snowflakes and flames, so as to reduce the number of renderings. Taking snow on the face as an example, through the combined use of the method according to the embodiments of the present disclosure and the particle system, it is possible to realize a 3D special effect of an accumulation of snow over time, or a special effect that a decoration, such as an icing, is attached to the face.

Figure 3:
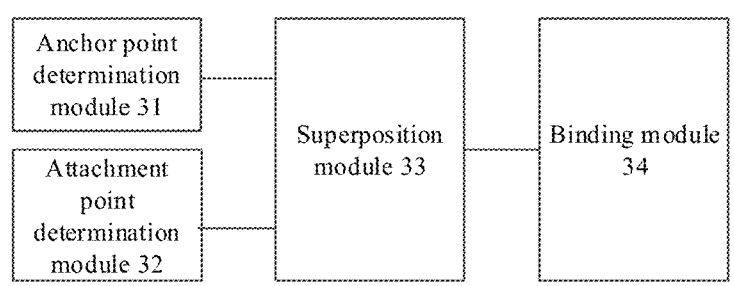
FIG. 3 is a schematic block diagram of a device for reconstructing a facial model according to an embodiment of the present disclosure.

FIG. 3 is a schematic block diagram of a device for reconstructing a facial model according to an embodiment of the present disclosure. Reference is made to FIG. 3, the device for reconstructing a facial model includes: an anchor point determination module 31, configured to determine an anchor point of a 3D special effect element to be attached on a face; an attachment point determination module 32 configured to determine an attachment point on a 3D facial model to which the 3D special effect element is to be attached, where the 3D facial model corresponds to the face; a superposition module 33, configured to attach the anchor point to the attachment point in a way that the anchor point overlaps the attachment point; and a binding module 34, configured to move the anchor point to a center of a world coordinate system of the 3D facial model, and bind the 3D special effect element with the 3D facial model.

With the above technical solution, the anchor point of the 3D special effect element to be attached to the face is determined, and the attachment point on the 3D facial model to which the 3D special effect element is to be attached is determined; the anchor point of the 3D special effect element is then attached on the attachment point in a way that the anchor point overlaps the attachment point; the anchor point is moved to the center of the world coordinate system of the 3D facial model, and the 3D effect element is bound with the 3D facial model. In this way, the 3D special effect element is attached to the surface of the 3D facial model, so that the 3D special effect element can universally fit any user face, and can move with and follow a face action in real time when the face moves. Hence, an offset of the 3D special effect element during a head rotation is avoided, and a real-time interaction between the 3D special effect element and the face action is improved. For example, when opening and closing eyes, the 3D special effected false eyelashes may move with the eyes synchronously, and rotate with an orientation of eyelids. In addition, in this technical solution, feature points namely attachment points of the 3D facial model are obtained, and an interaction between the 3D special effect element and the face can be expanded. For example, an effect that a spider climbs out of the mouth and climbs slowly on the face to the back of the head can be realized, and other procedural animations such as a face growth animation, a fluid animation, and the like can be realized.

Optionally, the attachment point determination module 22 is configured to: determine a vertex corresponding to a vertex identifier in the 3D facial model corresponding to the face; and determining, based on the vertex, the attachment point on the 3D facial model to which the 3D special effect element is to be attached.

Optionally, the binding module 34 is configured to: bind the 3D special effect element with the 3D facial model by disposing the 3D special effect element based on position information of the attachment point and rotation information of the attachment point.

Optionally, the rotation information is an average surface normal of an area where the attachment point is located.

Optionally, the device further includes a collision detection module. The collision detection module is configured to: detect a collision force of the three-dimensional special effect element colliding on the face during a process of the superposition module 33 attaching the anchor point to the attachment point in a way that the anchor point overlaps the attachment point; and determine, based on the collision force, an elastic change on the face.

Optionally, the device further includes an attachment area and quantity determination module. The attachment area and quantity determination module is configured to: determine, by using a weight map, an attachment area in which the 3D special effect element is attached on a surface of the 3D facial model, and a quantity of 3D special effect elements attached within the attachment area.

Figure 4:
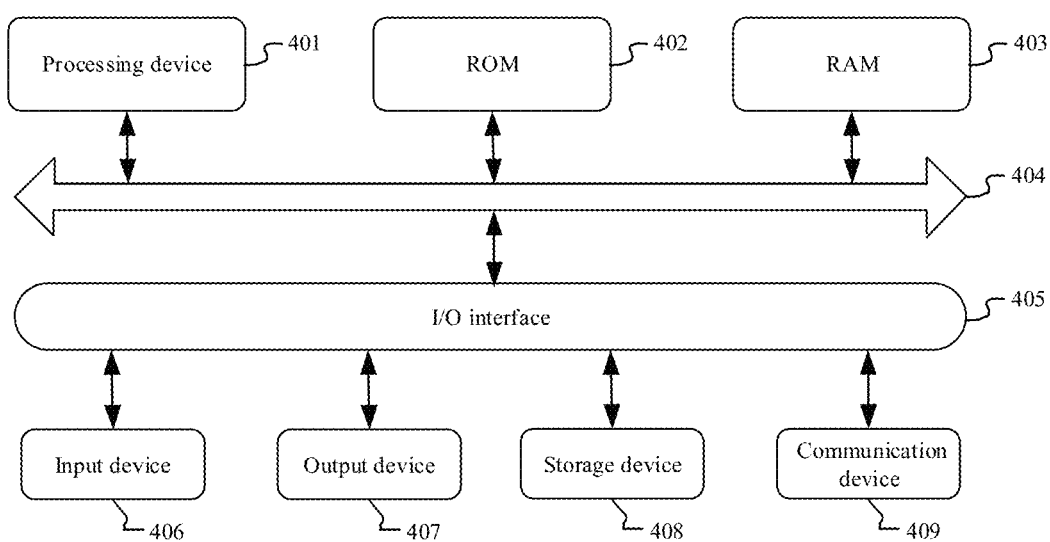
FIG. 4 is a schematic structural diagram of an electronic device according to an embodiment of the present disclosure.

Reference is made to FIG. 4, which shows a schematic structural diagram of an electronic device suitable for implementing the embodiments of the present disclosure. The electronic device in the embodiments of the present disclosure may include, but is not limited to, a mobile terminal, such as a mobile phone, a notebook computer, a digital broadcast receiver, a PDA (Personal Digital Assistant), a PAD (Tablet computer), a PMP (Portable Multimedia Player), a vehicle-mounted terminal (such as an in-vehicle navigation terminal), and a fixed terminal such as a digital TV, a desktop computer. The electronic device shown in FIG. 4 is only an example, and should not impose any limitation on the functions and applications of the embodiments of the present disclosure.

As shown in FIG. 4, the electronic device 400 may include a processing device (such as a central processing unit, and a graphics processor) 401 that may execute various appropriate actions and processes according to a program stored in a read only memory (ROM) 402 or loaded into random access memory (RAM) 403 from a storage device 408. Various programs and data necessary for the operation of the electronic device 400 are also stored in the RAM 403. The processing device 401, the ROM 402, and the RAM 403 are connected to each other through a bus 404. An input/output (I/O) interface 405 is also connected to the bus 404.

Generally, the following devices may be connected to the I/O interface 405: an input device 406 such as a touch screen, a touchpad, a keyboard, a mouse, a camera, a microphone, an accelerometer, a gyroscope, and the like; an output device 407, such as a liquid crystal display (LCD), a speaker, a vibrator, and the like; a storage device 408, such as a magnetic tape, a hard disk, and the like; and a communication device 409. The communication device 409 may enable the electronic device 400 to communicate in a wireless or wired manner with other devices to exchange data. Although FIG. 4 shows the electronic device 400 having various devices, it should be understood that not all of the illustrated devices are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 409, or from the storage device 408, or from the ROM 402. When the computer program is executed by the processing device 401, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, an electrical connection with one or more wires, a portable computer disk, a hard disk, a random access memory (RAM), a read only memory (ROM), an erasable Programmable read only memory (EPROM or flash memory), an optical fiber, a portable compact disk read only memory (CD-ROM), an optical storage device, a magnetic storage device, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium may be any computer-readable medium other than a computer-readable storage medium that can transmit, propagate, or transport the program for use by or in connection with the instruction execution system, apparatus or device. Program code stored on a computer readable medium may be transmitted using any suitable medium, including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (e.g., the Internet), and peer-to-peer networks (such as ad hoc peer-to-peer networks), as well as any current or future network.

The above-mentioned computer-readable medium may be included in the above-mentioned electronic device, or may stand alone without being assembled into the electronic device.

The above-mentioned computer-readable medium carries one or more programs. The one or more programs, when being executed by the electronic device, configure the electronic device to: determine an anchor point of a three-dimensional to be attached on a face; determine an attachment point on a three-dimensional facial model to which the three-dimensional special effect element is to be attached, where the three-dimensional facial model corresponds to the face; attach the anchor point to the attachment point in a way that the anchor point overlaps the attachment point; and move the anchor point to a center of a world coordinate system of the three-dimensional facial model, and bind the 3D special effect element with the 3D facial model.

Computer program codes for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to a user's computer through any kind of network, including a local area network (LAN) or a wide area network (WAN), or may be connected to an external computer (e.g., using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in a reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform specified functions or operations, or may be implemented by a combination of dedicated hardware and computer instructions.

The modules involved in the embodiments of the present disclosure may be implemented in a software manner, or in a hardware manner. The name of the modules does not constitute a limitation of the unit under any circumstances.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD), and the like.

In the present disclosure, a machine-readable medium may be a tangible medium that may contain or store a program for use by or in connection with an instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or apparatuses, or any suitable combination thereof. More specific examples of machine-readable storage media include electrical connections based on one or more wires, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, a method for reconstructing a facial model is provided in example 1. The method includes: determining an anchor point of a three-dimensional special effect element to be attached on a face; determining an attachment point on a three-dimensional facial model to which the three-dimensional special effect element is to be attached, wherein the three-dimensional facial model corresponds to the face; attaching the anchor point to the attachment point in a way that the anchor point overlaps the attachment point; and moving the anchor point to a center of a world coordinate system of the three-dimensional facial model, and binding the 3D special effect element with the 3D facial model.

According to one or more embodiments of the present disclosure, example 2 provides: the method in example 1 further including determining a vertex corresponding to a vertex identifier in the three-dimensional facial model corresponding to the face; and determining, based on the vertex, the attachment point on the three-dimensional facial model to which the three-dimensional special effect element is to be attached.

According to one or more embodiments of the present disclosure, example 3 provides: the method in example 1 in which binding the three-dimensional special effect element with the three-dimensional facial model includes disposing the three-dimensional special effect element based on position information of the attachment point and rotation information of the attachment point, and binding the three-dimensional special effect element with the three-dimensional facial model.

According to one or more embodiments of the present disclosure, example 4 provides: the method in example 1 further including that the rotation information is an average surface normal of a region where the attachment point is located.

According to one or more embodiments of the present disclosure, example 5 provides: the method in example 1 further including detecting a collision force of the three-dimensional special effect element colliding with the face during a process of attaching the anchor point with the attachment point; and determining an elastic change on the face based on the collision force.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by redisposing a feature with another feature having similar function disclosed in (but not limited to) the present disclosure.

Additionally, although operations are described in a particular order, this should not be construed as requiring that the operations to be performed in the particular order shown or in a sequential order. Under certain circumstances, multitasking and parallel processing may be advantageous. Similarly, although the above description contains several implementation details, these should not be construed as limitations on the scope of the present disclosure. Some features that are described in different embodiments may also be implemented in a same embodiment. Also, various features that are described in a single embodiment may be implemented in multiple embodiments separately or in any suitable sub-combination.

Although the subject matter has been described in language specific to structural features and/or logical acts, it is to be understood that the subject matter defined in the appended claims is not necessarily limited to the specific features or acts described above. Rather, the specific features and acts described above are merely examples for implementing the claims. As for the device in the above embodi-

The invention claimed is:

1. A method for reconstructing a facial model, comprising:
   determining an anchor point of a three-dimensional special effect element to be attached on a face, wherein the anchor point is a central position around which the three-dimensional effect element is to be shifted, rotated, and scaled;
   determining an attachment point on a three-dimensional facial model to which the three-dimensional special effect element is to be attached, wherein the three-dimensional facial model corresponds to the face;
   attaching the anchor point to the attachment point in a way that the anchor point overlaps the attachment point; and
   moving the anchor point to a center of a world coordinate system of the three-dimensional facial model, and binding the 3D special effect element with the 3D facial model.

2. The method according to claim 1, wherein determining the attachment point on the three-dimensional facial model to which the three-dimensional special effect element is to be attached comprises:
   determining a vertex corresponding to a vertex identifier in the three-dimensional facial model corresponding to the face; and
   determining, based on the vertex, the attachment point on the three-dimensional facial model to which the three-dimensional special effect element is to be attached.

3. The method according to claim 1, wherein binding the three-dimensional special effect element with the three-dimensional facial model comprises:
   disposing the three-dimensional special effect element based on position information of the attachment point and rotation information of the attachment point, to bind the three-dimensional special effect element with the three-dimensional facial model.

4. The method according to claim 3, wherein the rotation information is an average surface normal of a region where the attachment point is located.

5. The method according claim 1, further comprising:
   detecting a collision force of the three-dimensional special effect element colliding on the face during a process of attaching the anchor point to the attachment point in the way that the anchor point overlaps the attachment point; and
   determining an elastic change on the face based on the collision force.

6. The method according to claim 1, further comprising:
   determining, by using a weight map, an attachment area in which the three-dimensional special effect element is attached onto a surface of the three-dimensional facial model, and a quantity of three-dimensional special effect elements attached within the attachment area.

7. A device for reconstructing a facial model, comprising:
   a storage storing a computer program; and
   a processor configured to execute the computer program stored in the storage to:
      determine an anchor point of a three-dimensional special effect element to be attached on a face, wherein the anchor point is a central position around which the three-dimensional effect element is to be shifted, rotated, and scaled;
      determine an attachment point on a three-dimensional facial model to which the three-dimensional special effect element is to be attached, wherein the three-dimensional facial model corresponds to the face;
      attach the anchor point to the attachment point in a way that the anchor point overlaps the attachment point; and
      move the anchor point to overlap a center of a world coordinate system of the three-dimensional facial model, and bind the three-dimensional special effect element with the three-dimensional facial model.

8. The device according to claim 7, wherein the processor is further configured to:
   bind the three-dimensional special effect element with the three-dimensional facial model by disposing the three-dimensional special effect element based on position information of the attachment point and rotation information of the attachment point.

9. The device according to claim 7, wherein the processor is further configured to:
   determine, by using a weight map, an attachment area in which the three-dimensional special effect element is attached onto a surface of the three-dimensional facial model, and a quantity of three-dimensional special effect elements attached within the attachment area.

10. The device according to claim 7, wherein the processor is further configured to implement:
    determining a vertex corresponding to a vertex identifier in the three-dimensional facial model corresponding to the face; and
    determining, based on the vertex, the attachment point on the three-dimensional facial model to which the three-dimensional special effect element is to be attached.

11. The device according to claim 7, wherein the processor is further configured to implement:
    detecting a collision force of the three-dimensional special effect element colliding on the face during a process of attaching the anchor point to the attachment point in the way that the anchor point overlaps the attachment point; and
    determining an elastic change on the face based on the collision force.

12. The device according to claim 7, wherein the processor is further configured to implement:
    disposing the three-dimensional special effect element based on position information of the attachment point and rotation information of the attachment point, to bind the three-dimensional special effect element with the three-dimensional facial model.

13. The device according to claim 12, wherein the rotation information is an average surface normal of a region where the attachment point is located.

14. A non-transitory computer-readable medium storing a computer program, wherein, the computer program, when being executed by a processing device, implements:
    determining an anchor point of a three-dimensional special effect element to be attached on a face, wherein the anchor point is a central position around which the three-dimensional effect element is to be shifted, rotated, and scaled;
    determining an attachment point on a three-dimensional facial model to which the three-dimensional special effect element is to be attached, wherein the three-dimensional facial model corresponds to the face;
    attaching the anchor point to the attachment point in a way that the anchor point overlaps the attachment point; and moving the anchor point to a center of a world coordinate system of the three-dimensional facial model, and binding the 3D special effect element with the 3D facial model.

15. The computer-readable medium according to claim 14, wherein the computer program, when being executed by the processing device, further implements:
determining a vertex corresponding to a vertex identifier in the three-dimensional facial model corresponding to the face; and
determining, based on the vertex, the attachment point on the three-dimensional facial model to which the three-dimensional special effect element is to be attached.

16. The computer-readable medium according to claim 14, wherein the computer program, when being executed by the processing device, further implements:
disposing the three-dimensional special effect element based on position information of the attachment point and rotation information of the attachment point, to bind the three-dimensional special effect element with the three-dimensional facial model.

17. The computer-readable medium according to claim 16, wherein the rotation information is an average surface normal of a region where the attachment point is located.

18. The computer-readable medium according to claim 14, wherein the computer program, when being executed by the processing device, further implements:
detecting a collision force of the three-dimensional special effect element colliding on the face during a process of attaching the anchor point to the attachment point in the way that the anchor point overlaps the attachment point; and
determining an elastic change on the face based on the collision force.

* * * * *